US012441075B2

(12) United States Patent
Lai

(10) Patent No.: US 12,441,075 B2
(45) Date of Patent: Oct. 14, 2025

(54) BOX FOLDING MACHINE

(71) Applicant: EXPACK INDUSTRIAL CORPORATION, Taichung (TW)

(72) Inventor: Yu-Ting Lai, Taichung (TW)

(73) Assignee: EXPACK INDUSTRIAL CORPORATION, Taichung (TW)

(*) Notice: Subject to any disclaimer, the term of this patent is extended or adjusted under 35 U.S.C. 154(b) by 93 days.

(21) Appl. No.: 18/427,301

(22) Filed: Jan. 30, 2024

(65) Prior Publication Data

US 2025/0121576 A1 Apr. 17, 2025

(30) Foreign Application Priority Data

Oct. 16, 2023 (TW) ................................ 112211099

(51) Int. Cl.

*B31B 50/04* (2017.01)
*B31B 50/02* (2017.01)
*B31B 50/07* (2017.01)

(52) U.S. Cl.

CPC .......... *B31B 50/044* (2017.08); *B31B 50/022* (2017.08); *B31B 50/07* (2017.08)

(58) Field of Classification Search

CPC ....... B31B 50/044; B31B 50/52; B31B 50/07; B31B 50/022

See application file for complete search history.

(56) References Cited

U.S. PATENT DOCUMENTS

| | | | | |
|---|---|---|---|---|
| 3,911,799 A * | 10/1975 | Klund | B31B 50/00 | 493/313 |
| 6,913,568 B2 * | 7/2005 | Frank | B31B 50/802 | 493/309 |
| 9,027,315 B2 * | 5/2015 | Tsutsumi | B65B 43/305 | 53/381.1 |
| 9,126,380 B2 * | 9/2015 | Dittmer | B31B 50/00 | |
| 10,273,042 B1 * | 4/2019 | Kolodziey | B31B 50/003 | |
| 2007/0293383 A1 * | 12/2007 | Gebhardt | B31B 50/78 | 493/313 |
| 2010/0173765 A1 * | 7/2010 | Iwasa | B31B 50/00 | 493/183 |
| 2010/0204030 A1 * | 8/2010 | Pazdernik | B31B 50/07 | 493/317 |
| 2018/0126683 A1 * | 5/2018 | Johnson | B31B 50/046 | |

(Continued)

FOREIGN PATENT DOCUMENTS

TW M331438 5/2008

*Primary Examiner* — Thomas M Wittenschlaeger
(74) *Attorney, Agent, or Firm* — Burris Law, PLLC

(57) ABSTRACT

A box folding machine includes a base driving member, a pair of positioning units, and a base frame unit that has two opposite end portions. The base driving member is operable to drive the base frame unit to move between a first position, in which the end portions of the base frame unit are substantially arranged along a first direction, and a second position, in which the end portions of the base frame unit are substantially arranged along a second direction. Each of the positioning units includes a positioning seat. When the base frame unit is in the first position, the positioning seats of the positioning units are proximate to each other in the second direction and are misaligned from each other. When the base frame unit is in the second position, the positioning seats are distal from each other in the second direction.

5 Claims, 9 Drawing Sheets

(56) References Cited

U.S. PATENT DOCUMENTS

| | | | | |
|---|---|---|---|---|
| 2024/0083131 | A1* | 3/2024 | Lam | B31B 50/066 |
| 2024/0116260 | A1* | 4/2024 | Osada | B31B 50/042 |
| 2024/0300201 | A1* | 9/2024 | Ericson | B31B 50/07 |
| 2025/0121576 | A1* | 4/2025 | Lai | B31B 50/044 |

* cited by examiner

BOX FOLDING MACHINE

CROSS-REFERENCE TO RELATED APPLICATION

This application claims priority to Taiwanese Utility Model Patent Application No. 112211099, filed on Oct. 16, 2023, the entire disclosure of which is incorporated by reference herein.

FIELD

The disclosure relates to packaging equipment, and more particularly to a box folding machine.

BACKGROUND

A common paper box for containing goods includes a main box body, two first bottom boards that are connected to a bottom portion of the main box body, two second bottom boards that are connected to the bottom portion of the main box body, two first top boards that are connected to a top portion of the main box body, and two second top boards that are connected to the top portion of the main box body.

To facilitate transportation of the common paper box and to save storage space, the main box body is flattened with the first bottom boards, the second bottom boards, the first top boards, and the second top boards not folded toward the main box body.

In order to form the paper box, the main box body has to be pulled open so that the main box body may define an opening, and then the first and second bottom boards are folded and taped to close the opening. If the aforementioned procedure is carried out manually, when there are a number of the paper boxes, such procedure may be labor-intensive and time-consuming. Therefore, machines are used for carrying out this procedure so that productivity may be increased, and that production costs and time may be reduced.

A conventional box folding machine structure disclosed in Taiwanese Patent No. M331438 includes a machine body, an input device that is disposed on one side of the machine body and that is adapted for feeding a paper box whose main box body is flattened into the machine body, a box-holding device that is adapted for holding the paper box whose main box body is flattened, a first folding device and a second folding device that are disposed below the box-holding device and that are adapted for folding first bottom boards and second bottom boards of the paper box when the main box body is pulled open, and an output device that is adapted for pushing the paper box which has a containing space defined by the main box body and the first and second bottom boards thereof out of the machine body.

Although the conventional box folding machine structure may fold boxes automatically, it is a good idea to provide a greater selection of box folding machines with simplified structures to the industry and consumers.

SUMMARY

Therefore, an object of the disclosure is to provide a box folding machine that has a configuration different from the abovementioned prior art.

According to the disclosure, the box folding machine includes a machine frame, a base driving member, a base frame unit, a pair of positioning units, a pair of pushing units, and a pair of guide frame units. The base driving member is mounted to the machine frame. The base frame unit is rotatably mounted to the machine frame and has two opposite end portions. The base driving member is operable to drive the base frame unit to move between a first position, in which the end portions of the base frame unit are substantially arranged along a first direction, and a second position, in which the end portions of the base frame unit are substantially arranged along a second direction orthogonal to the first direction. The positioning units are respectively and rotatably disposed adjacent to the end portions of the base frame unit. Each of the positioning units includes a positioning seat, and at least one vacuum suction member that is disposed on the positioning seat. When the base frame unit is in the first position, the positioning seats of the positioning units are proximate to each other in the second direction and are misaligned from each other in the second direction. When the base frame unit is in the second position, the positioning seats are distal from each other in the second direction and are substantially aligned with each other in the second direction. The pushing units are mounted to the machine frame and are spaced apart from each other in the first direction. Each of the pushing units includes a standing frame, a pushing member that is rotatably mounted to the standing frame, and a pushing driving member that is mounted to the standing frame and the pushing member. The pushing member of each of the pushing units has a frame-mounting end that is rotatably mounted to the standing frame, and a moving end opposite to the frame-mounting end. For each of the pushing units, the pushing driving member is operable to drive the pushing member to convert between an initial state, in which the moving end of the pushing member is proximate to the standing frame, and a pushing state, in which the moving end of the pushing member is distal from the standing frame. The guide frame units are mounted to the machine frame. Each of the guide frame units includes a guide frame that is pivotably mounted to the machine frame, and at least one guide driving member that is mounted to the machine frame and the guide frame. The guide frame of each of the guide frame units has a pivot end that is pivotably mounted to the machine frame, and a guide rod that is opposite to the pivot end and that is located between the pushing units. The guide driving members of the guide frame units are operable to drive the guide frames of the guide frame units to convert between an open state, in which the guide rods of the guide frames are distal from each other, and a close state, in which the guide rods of the guide frames are proximate to each other.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
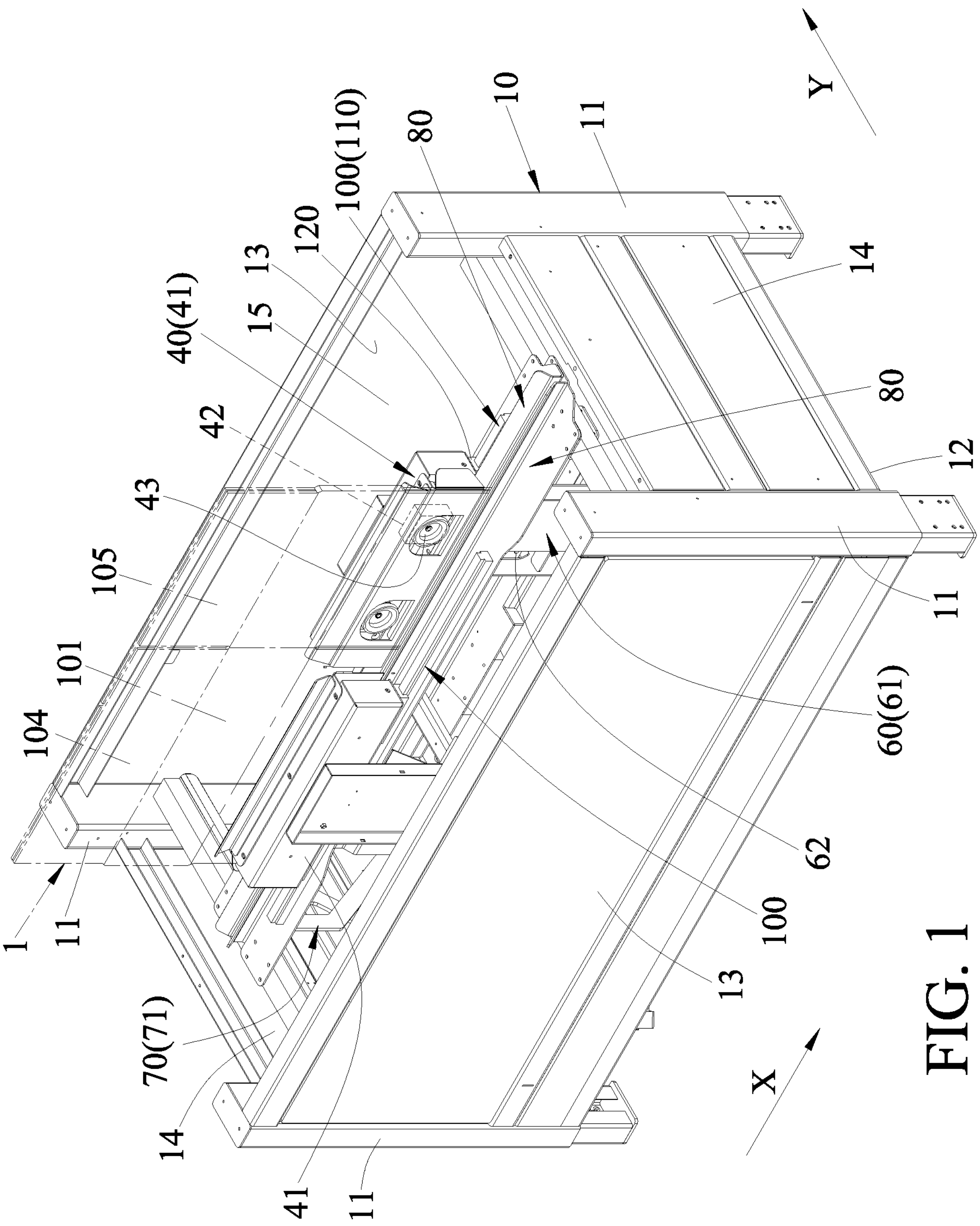
FIG. 1 is a perspective view of an embodiment of a box folding machine according to the disclosure.
Figure 2:
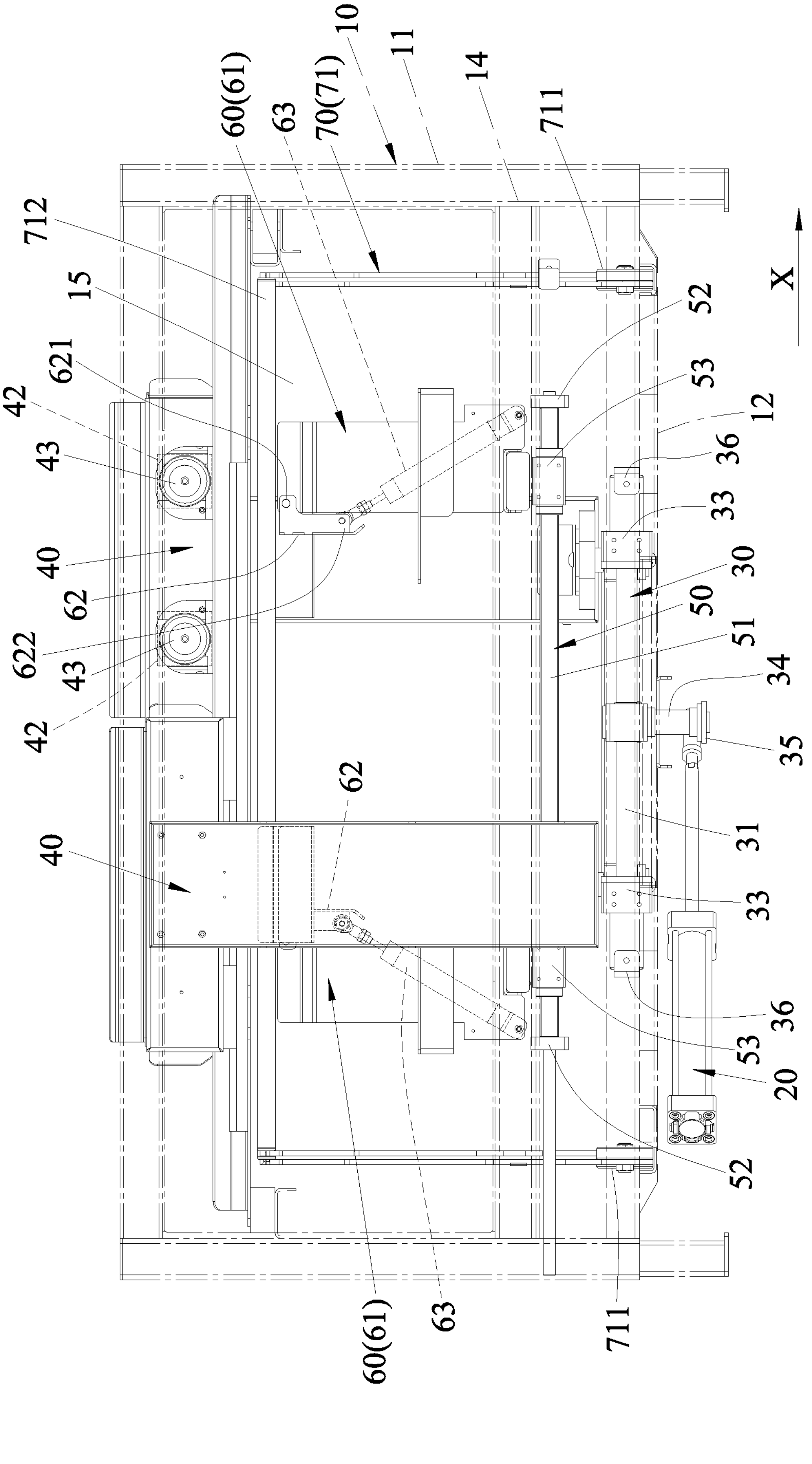
FIG. 2 is a schematic sectional view of the embodiment.
Figure 3:
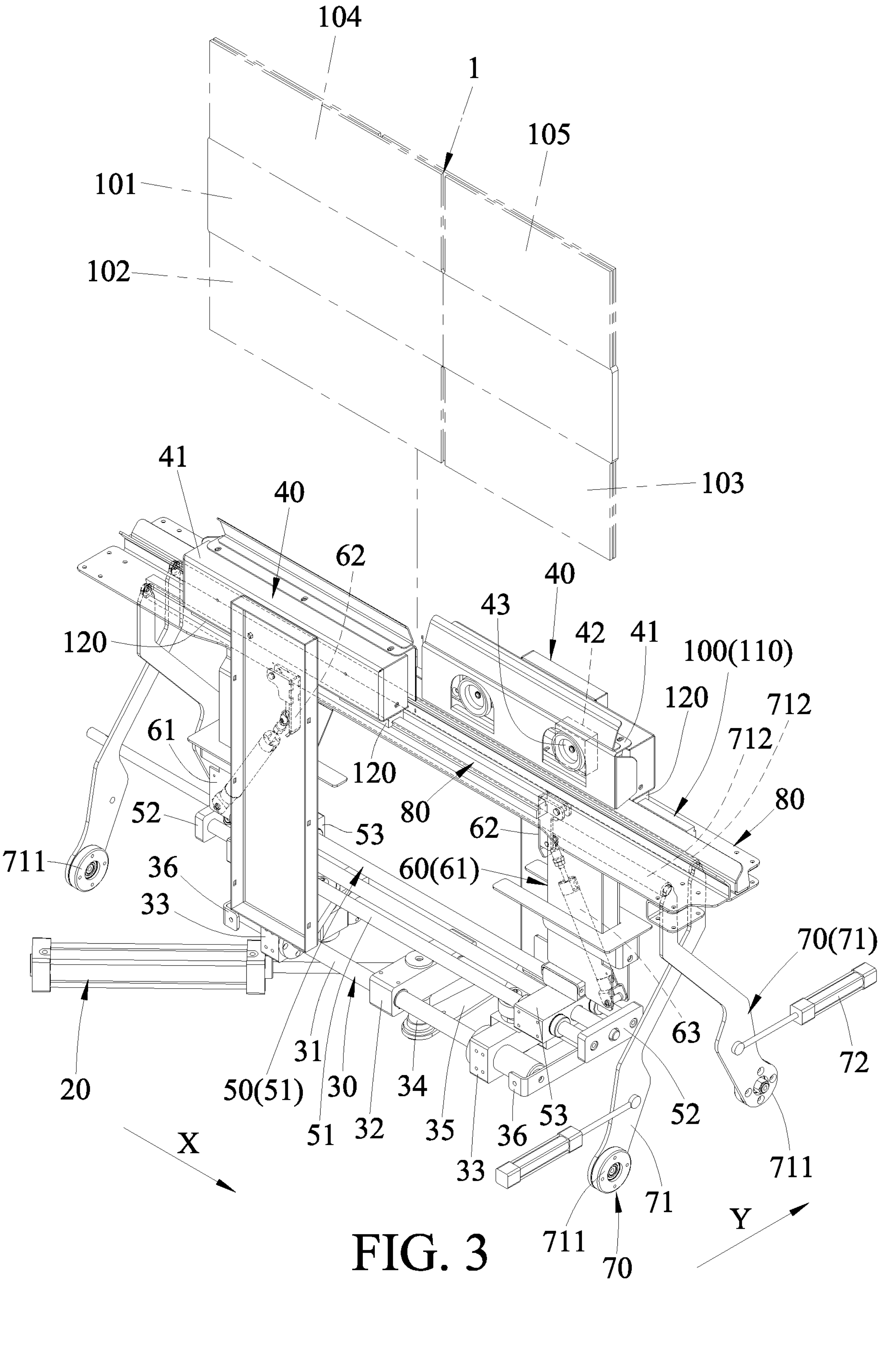
FIG. 3 is a perspective view of a part of the embodiment illustrating the part of the embodiment in an initial state.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 3, and 9, an embodiment of a box folding machine according to the disclosure is adapted for folding a box 1. The box 1 includes a main box body 101, two first bottom boards 102 that are connected to the main box body 101, two second bottom boards 103 that are connected to the main box body 101, two first top boards 104 that are connected to the main box body 101, and two second top boards 105 that are connected to the main box body 101. The box 1 is convertible between a storage state (see FIG. 9(A)), in which the main box body 101 is flattened with the first bottom boards 102, the second bottom boards 103, the first top boards 104, and the second top boards 105 not folded toward the main box body 101, and a container state (see FIG. 9(E)), in which the main box body 101 is pulled open and defines an opening, and in which the first and second bottom boards 102, 103 are folded toward the main box body 101 to close the opening. When the box 1 is in the container state, the box 1 has a containing space that is defined by the main box body 101 and the first and second bottom boards 102, 103 thereof.

The box folding machine includes a machine frame 10, a base drive member 20, a base frame unit 30, a pair of positioning units 40, a support frame unit 50, a pair of pushing units 60, a pair of guide frame units 70, a pair of guiding units 80, and a pair of linear guide rail units 100.

The machine frame 10 includes four stand columns 11, a base plate 12 that interconnects the stand columns 11, a pair of first side plates 13 each of which extends along a first direction (X), and a pair of second side plates 14 each of which extends along a second direction (Y) orthogonal to the first direction (X). Two of the stand columns 11 are respectively connected to two opposite sides of one of the first side plates 13 in the first direction (X). The remaining two of the stand columns 11 are respectively connected to two opposite sides of another one of the first side plates 13 in the first direction (X). One of the second side plates 14 interconnects one of the stand columns 11 that are connected to the one of the first side plates 13 and one of the stand columns 11 that are connected to the another one of the first side plates 13. Another one of the second side plates 14 interconnects another one of the stand columns 11 that are connected to the one of the first side plates 13 and another one of the stand columns 11 that are connected to the another one of the first side plates 13. The stand columns 11, the base plate 12, the first side plates 13 and the second side plates 14 cooperatively define an accommodating space 15 that opens upwardly.

The base driving member 20 is configured to be a pressure cylinder, is mounted to the base plate 12 of the machine frame 10, and is located below the base plate 12.

Figure 4:
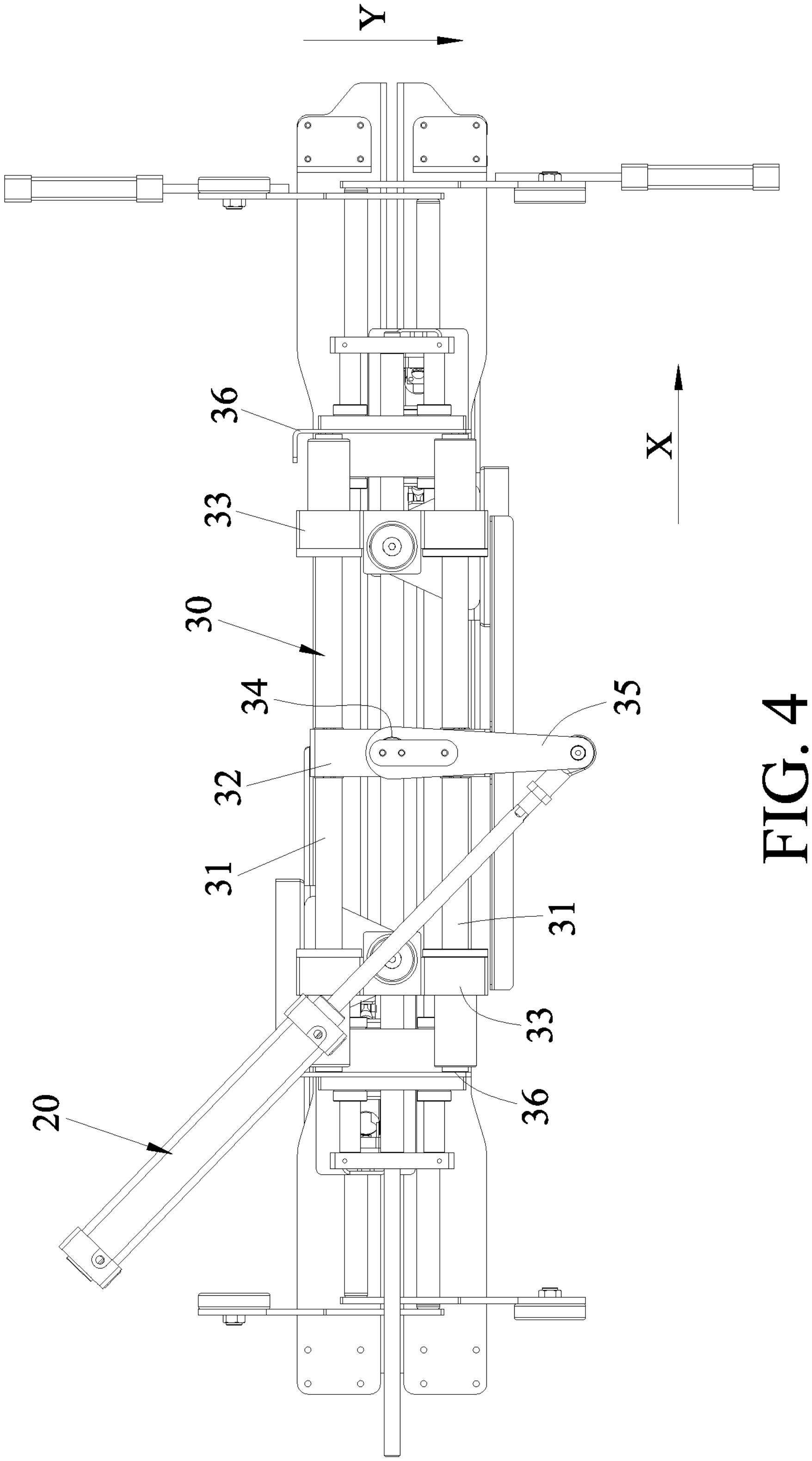
FIG. 4 is a bottom view of the part of the embodiment.

The base frame unit 30 is rotatably mounted to the machine frame 10, and is located in the accommodating space 15. The base frame unit 30 includes two spaced-apart frame rods 31, a first seat body 32 that is fixedly mounted to the frame rods 31, two second seat bodies 33 that are located at two opposite sides of the first seat body 32 and that are movably mounted to the frame rods 31, a shaft 34 that is connected to the first seat body 32 and that is rotatably mounted to the base plate 12 of the machine frame 10, and a swing arm 35 that is connected to the shaft 34, and has two opposite end portions 36. Each of the frame rods 31 has two opposite ends that are respectively connected to the end portions 36 (i.e., each of the end portions 36 interconnects the frame rods 31). Each of the end portions 36 is configured to be plate-shaped. The second seat bodies 33 are respectively adjacent to the end portions 36, and are located between the end portions 36. The base driving member 20 is operable to drive the base frame unit 30 to move between a first position (see FIGS. 3 and 4), in which the end portions 36 of the base frame unit 30 are substantially arranged along the first direction (X), and a second position (see FIGS. 5 and 6), in which the end portions 36 of the base frame unit 30 are substantially arranged along the second direction (Y). That is to say, when the base frame unit 30 is rotated about an axis that is orthogonal to the first and second directions (X, Y) by 90 degrees, the base frame unit 30 is moved from one of the first and second positions to another one of the first and second positions. The frame rods 31, the first seat body 32, the second seat bodies 33, and the end portions 36 are located above the base plate 12. The swing arm 35 is located below the base plate 12. The shaft 34 extends through the base plate 12. The base driving member 20 is operable to drive the swing arm 35 to rotate such that the base frame unit 30 rotates relative to the machine frame 10.

The positioning units 40 are respectively and rotatably disposed adjacent to the end portions 36 of the base frame unit 30, and are located in the accommodating space 15. Each of the positioning units 40 includes a positioning seat 41 that has an L-shaped cross section, two cylinder bodies 42 that are disposed in the positioning seat 41, and two vacuum suction members 43 that are disposed on the positioning seat 41 and that are respectively driven by the cylinder bodies 42. The second seat bodies 33 of the base frame unit 30 are respectively and rotatably mounted to the positioning seats 41 of the positioning units 40. When the base frame unit 30 is in the first position, the positioning seats 41 of the positioning units 40 are proximate to each other in the second direction (Y), and are misaligned from each other in the second direction (Y) (see FIG. 3). When the base frame unit 30 is in the second position, the positioning seats 41 are distal from each other in the second direction (Y), and are substantially aligned with each other in the second direction (Y) (see FIG. 5).

The support frame unit 50 is mounted to the machine frame 10, is located in the accommodating space 15, and includes two spaced-apart support rods 51 each of which has two opposite ends, two rod end seats 52, and two slide seats 53. The ends of each of the support rods 51 are respectively and fixedly mounted to the rod end seats 52 (i.e., each of the rod end seats 52 interconnects the support rods 51). The slide seats 53 are located between the rod end seats 52. Each of the slide seats 53 is movably mounted to the support rods 51.

The pushing units 60 are mounted to the machine frame 10, are located in the accommodating space 15, and are spaced apart from each other in the first direction (X). Each of the pushing units 60 includes a standing frame 61 that is fixedly mounted to a respective one of the slide seats 53, a pushing member 62 that is rotatably mounted to the standing frame 61, and a pushing driving member 63 that is mounted to the standing frame 61 and the pushing member 62. The pushing member 62 of each of the pushing units 60 has a frame-mounting end 621 (see FIG. 2) that is rotatably mounted to the standing frame 61, and a moving end 622 opposite to the frame-mounting end 621. For each of the pushing units 60, the pushing driving member 63 is configured to be a pressure cylinder, and is operable to drive the pushing member 62 to convert between an initial state (see FIGS. 2 and 5), in which the moving end 622 of the pushing member 62 is proximate to the standing frame 61, and a pushing state (see FIG. 7), in which the moving end 622 of the pushing member 62 is distal from the standing frame 61.

The guide frame units 70 are mounted to the machine frame 10, and are located in the accommodating space 15. Each of the guide frame units 70 includes a guide frame 71 that is pivotally mounted to the machine frame 10, and a guide driving member 72 that is mounted to the machine frame 10 and the guide frame 71. The guide frame 71 of each of the guide frame units 70 has a pair of pivot ends 711 each of which is pivotably mounted to the machine frame 10, and a guide rod 712 (see FIG. 2) that is opposite to the pair of the pivot ends 711, that is located between the pushing units 40, and that is elongated along the first direction (X). Each of the guide driving members 72 of the guide frame units 70 is configured to be a pressure cylinder. The guide driving member 72 of the guide frame units 70 are operable to drive the guide frames 71 of the guide frame units 70 to convert between an open state (see FIG. 5), in which the guide rods 712 of the guide frames 71 are distal from each other, and a close state (see FIG. 3), in which the guide rods 712 of the guide frames 71 are proximate to each other.

The guiding units 80 are mounted to the machine frame 10, are slidable relative to the machine frame 10 in the second direction (Y), and are located in the accommodating space 15. Each of the guiding units 80 is elongated in the first direction (X), and is configured to be plate-shaped. The guiding units 80 respectively co-move with the positioning units 40 so that when the base frame unit 30 is in the first position, the guiding units 80 are proximate to each other in the second direction (Y) (see FIG. 3), and that when the base frame unit 30 is in the second position, the guiding units 80 are distal from each other in the second direction (Y) (see FIG. 5). Each of the guiding units 80 limits orientation of the positioning seat 41 of the respective one of the positioning units 40. The guiding units 80 are adapted for the box 1 that is in the storage state to be inserted therebetween so that the box 1 in the storage state is positioned by the guiding units 80 (see FIG. 1).

Referring to FIGS. 3 and 5 again, each of the linear guide rail units 100 is disposed between a respective one of the guiding units 80 and a respective one of the positioning seats 41. The linear guide rail units 100 are spaced apart from each other in the second direction (Y). Each of the linear guide rail units 100 includes a guide rail 110 that is elongated in the first direction (X), and a pair of slide blocks 120 that are slidably coupled to the guide rail 110. Each of the positioning seats 41 is fixedly mounted to the slide blocks 120 of the respective one of the linear guide rail units 100.

Referring to FIGS. 1 and 3 again, when the box folding machine is assembled and is in its initial state, the base frame unit 30 is in the first position, the positioning seats 41 are proximate to each other and are misaligned from each other in the second direction (Y), the pushing members 62 are in the initial state, and the guide frames 71 are in the close state. It is noted that, in order to illustrate operation of the box folding machine, the machine frame 10 is not shown in FIG. 3.

Referring to FIG. 3 again, when the box folding machine is in its initial state, an operator of the box folding machine may insert the box 1 that is in the storage state (see FIG. 9(A)) between the guiding units 80. The guiding units 80 cooperatively hold the box 1 such that the box 1 is positioned by the guiding units 80. At this time, the positioning seats 41 are located at two opposite sides of the box 1 in the second direction (Y) (see FIG. 1).

Afterwards, the cylinder bodies 42 of each of the positioning units 40 are actuated to respectively drive the vacuum suction members 43 of the positioning unit 40 to abut against the box 1. When a piece of vacuum equipment (not shown) that is connected to the box folding machine is actuated, each of the sides of the box 1 is sucked by the vacuum suction members 43 of a respective one of the positioning units 40.

Figure 5:
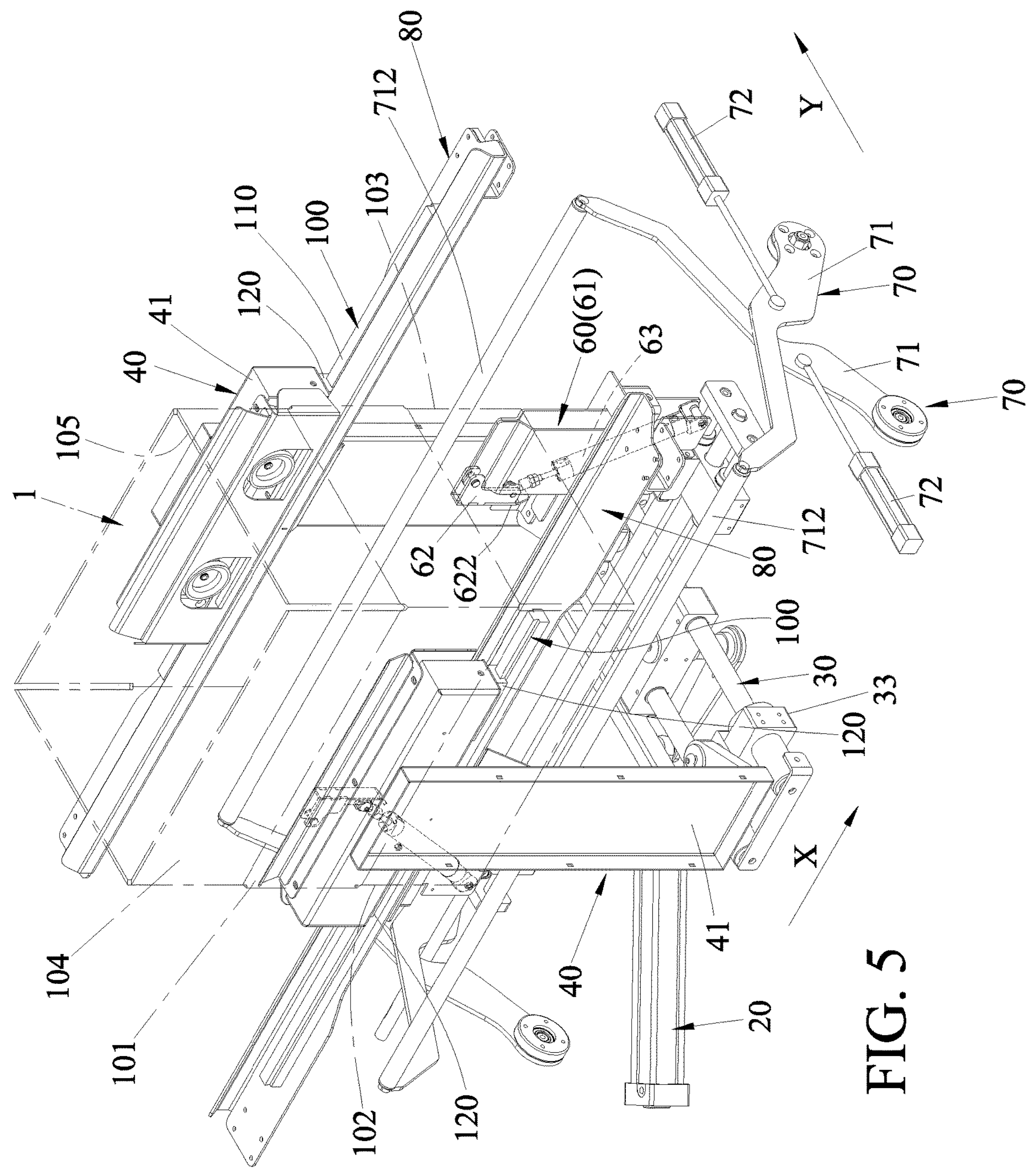
FIG. 5 is a perspective view of the part of the embodiment illustrating a pair of pushing units of the embodiment in an initial state and a pair of guide frame units of the embodiment in an open state.
Figure 6:
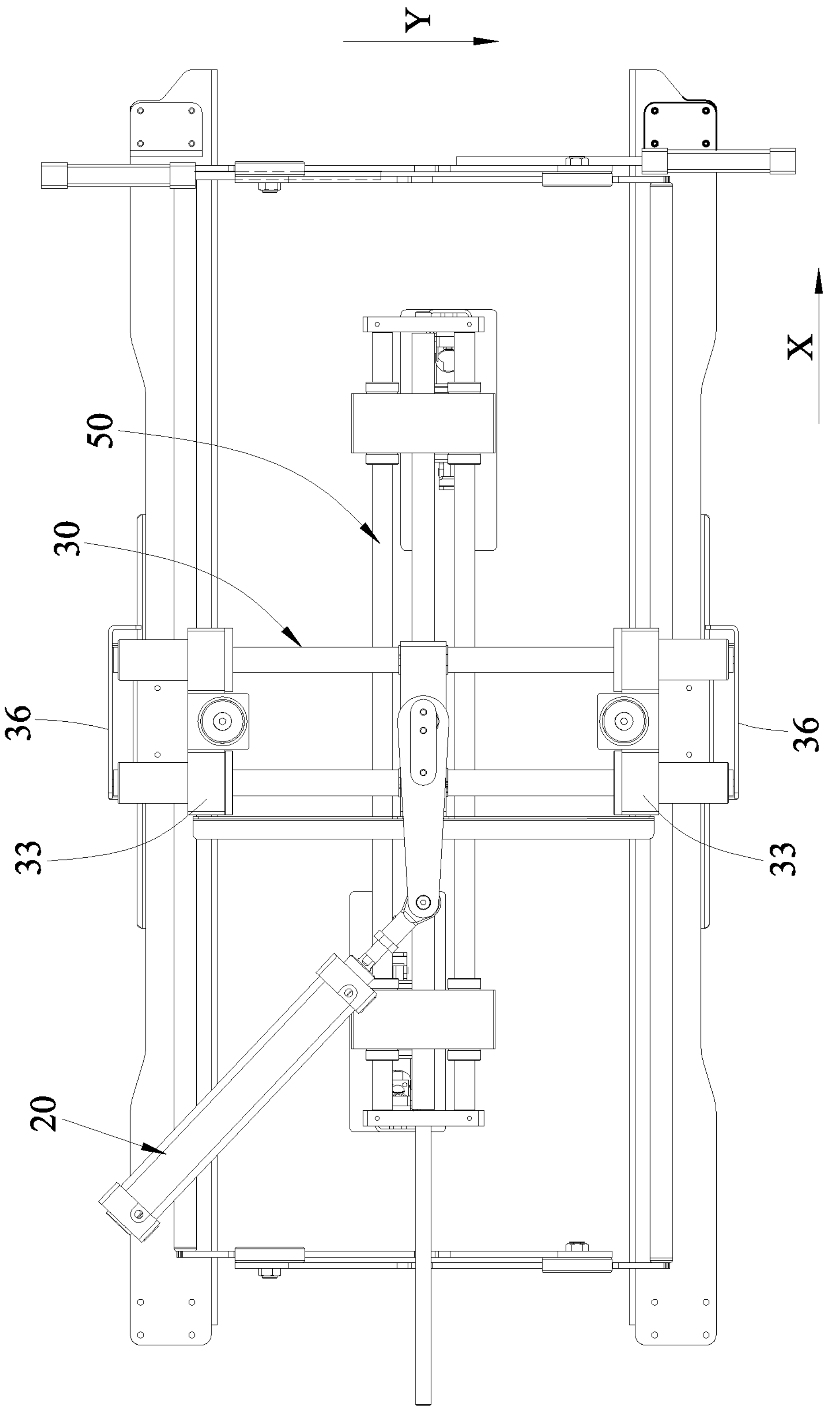
FIG. 6 is a bottom view of the part of the embodiment shown in FIG. 5.

Then, the base driving member 20 is actuated to drive the base frame unit 30 to rotate from the first position (see FIGS. 3 and 4) to the second position (see FIGS. 5 and 6). At this time, the positioning units 40 are urged by rotation of the base frame unit 30 to move away from each other, and each of the guiding units 80 cooperates with the respective one of the linear guide rail units 100 to limit the orientation of the respective one of the positioning seats 41. Therefore, when the base frame unit 30 rotates, the positioning seat 41 of each of the positioning units 40 is only allowed to slide relative to the respective one of the linear guide rail units 100 in the first direction (X) while rotating relative to the respective one of the second seat bodies 33. Because each of the sides of the box 1 is sucked by the vacuum suction members 43 of the respective one of the positioning units 40, when the positioning units 40 are urged by the rotation of the base frame unit 30 to move away from each other, the main box body 101 of the box 1 is pulled open and defines the opening (see FIGS. 5 and 9(B)). At this time, the guide driving members 72 of the guide frame units 70 are actuated to drive the guide frames 71 of the guide frame units 70 to convert from the close state to the open state. Thus, the guide rods 712 of the guide frames 71 are distal from each other.

Figure 7:
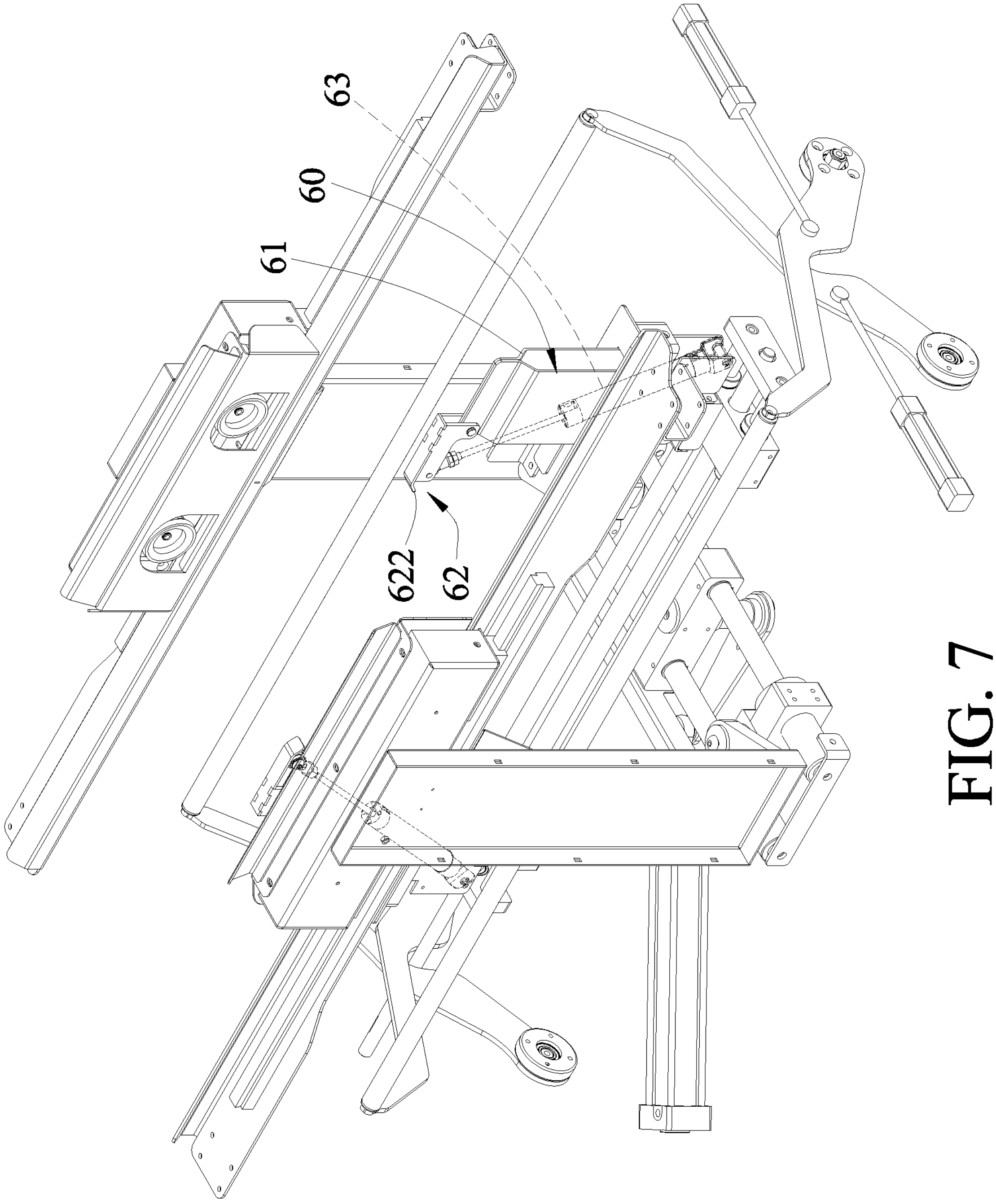
FIG. 7 is a perspective view of the part of the embodiment illustrating the pushing units in a pushing state and the guide frame units in the open state.

Afterwards, as shown in FIGS. 7 and 9(C), the pushing driving members 63 of the pushing units 60 are actuated to convert the pushing members 62 from the initial state to the pushing state so that the pushing members 62 respectively push the second bottom boards 103 of the box 1 toward the opening defined by the main box body 101 (see curved arrows in FIG. 9(C). Therefore, the second bottom boards 103 are folded toward the main box body 101. It is noted that, in order to illustrate the pushing state of the pushing members 62, the box 1 is not shown in FIG. 7.

Figure 8:
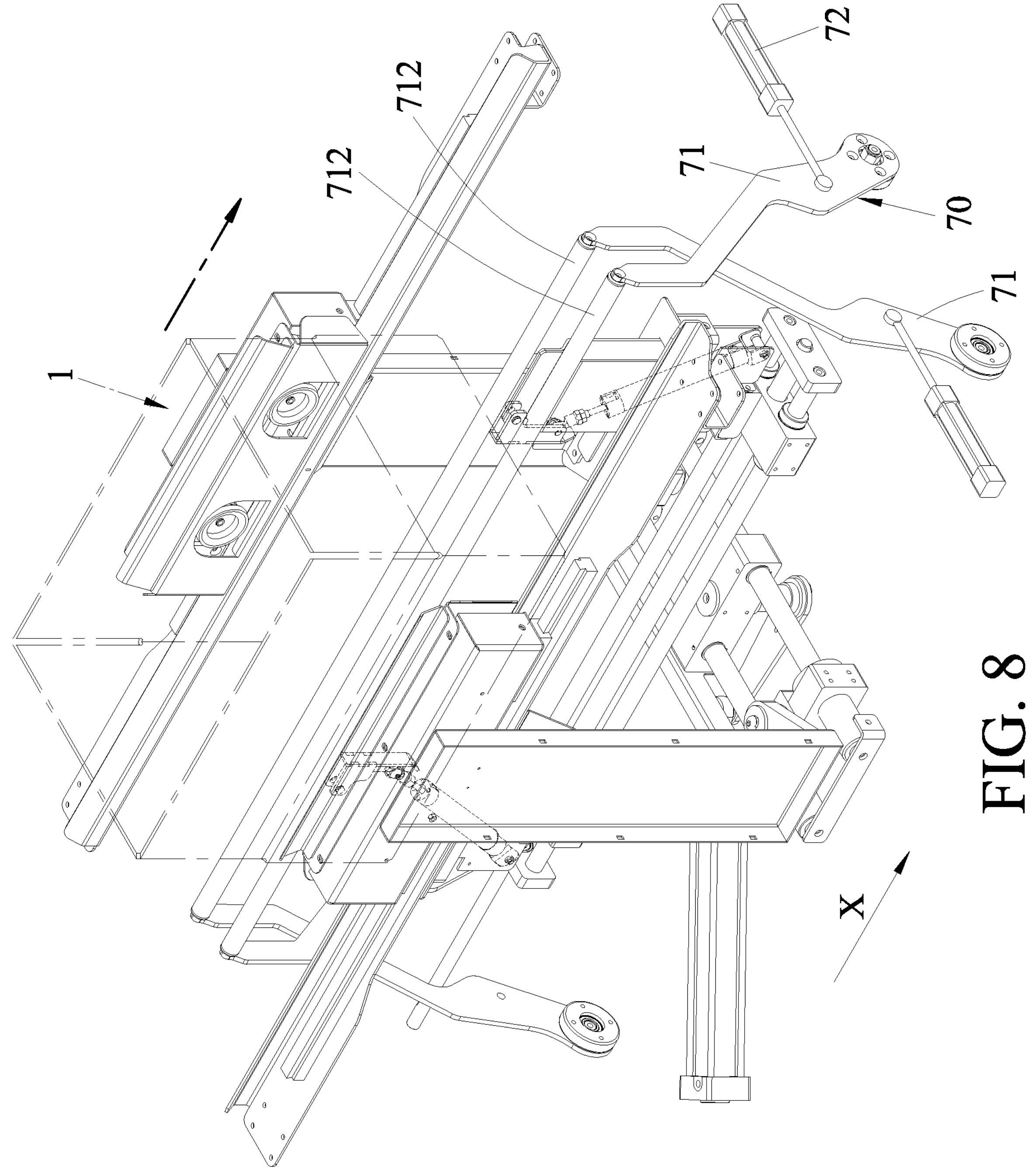
FIG. 8 is a perspective view of the part of the embodiment illustrating the pushing units in the initial state and the guide frame units in a close state.
Figure 9:
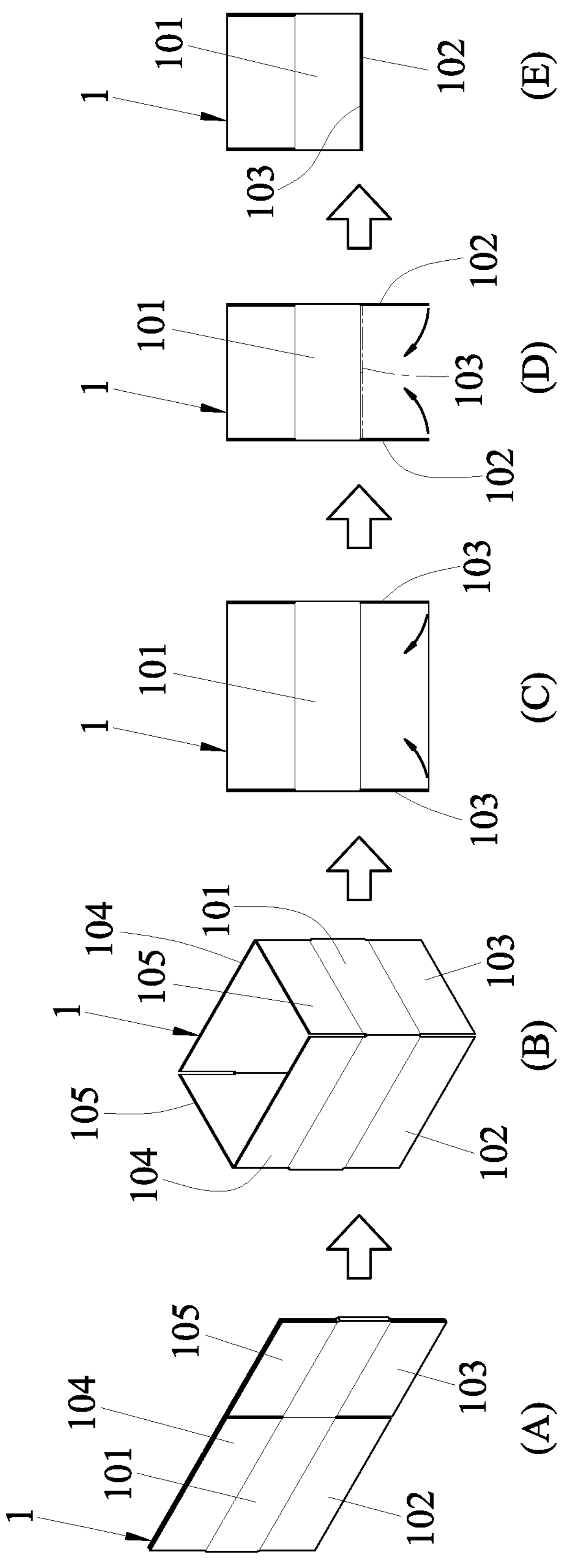
FIG. 9 is a schematic view illustrating how a box is folded by the embodiment.

Then, as shown in FIGS. 8 and 9(D), the guide driving members 72 of the guide frame units 70 are actuated to convert the guide frames 71 from the open state to the close state. At this time, the guide rods 712 are urged to move toward each other, and thereby respectively push the first bottom boards 102 of the box 1 toward the opening defined by the main box body 101 (see curved arrows in FIG. 9(D)). Therefore, the first bottom boards 102 and the second bottom boards 103 are all folded toward the main box body 101 (i.e., the box 1 is in the container state as shown in FIG. 9(E)). At this time, the pushing driving members 63 of the pushing units 60 are actuated to convert the pushing members 62 from the pushing state to the initial state.

Referring to FIG. 8 again, the guide rods 712 cooperatively serve as a conveying rail. Thus, when the box 1 that is in the container state is pushed by an external force (not shown) in the first direction (X), the box 1 is urged to move along the guide rods 712 in the first direction (X) so that the box 1 may be conveyed to another place for a subsequent step (e.g., a bottom-board-taping step).

Therefore, the box folding machine converts the box 1 from the storage state (see FIG. 9(A)) to the container state (see FIG. 9(E)) sequentially by pulling the main box body 101 open (see FIG. 9(B)), folding the second bottom boards 103 toward the main box body 101 (see FIG. 9(C)), and folding the first bottom boards 102 toward the main box body 101 (see FIG. 9(D)). The box folding machine may complete the aforementioned process smoothly and swiftly, and the overall structure thereof is relatively simple.

In summary, the box folding machine has a relatively simple structure and may thus ensure a smooth operation, thereby achieving the purpose of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A box folding machine comprising:

a machine frame;

a base driving member mounted to the machine frame;

a base frame unit rotatably mounted to the machine frame and having two opposite end portions, the base driving member being operable to drive the base frame unit to move between a first position, in which the end portions of the base frame unit are substantially arranged along a first direction, and a second position, in which the end portions of the base frame unit are substantially arranged along a second direction orthogonal to the first direction;

a pair of positioning units respectively and rotatably disposed adjacent to the end portions of the base frame unit, each of the positioning units including a positioning seat, and at least one vacuum suction member that is disposed on the positioning seat, when the base frame unit is in the first position, the positioning seats of the positioning units being proximate to each other in the second direction and being misaligned from each other in the second direction, when the base frame unit is in the second position, the positioning seats being distal from each other in the second direction and being substantially aligned with each other in the second direction;

a pair of pushing units mounted to the machine frame and spaced apart from each other in the first direction, each of the pushing units including a standing frame, a pushing member that is rotatably mounted to the standing frame, and a pushing driving member that is mounted to the standing frame and the pushing member, the pushing member of each of the pushing units having a frame-mounting end that is rotatably mounted to the standing frame, and a moving end opposite to the frame-mounting end, for each of the pushing units, the pushing driving member being operable to drive the pushing member to convert between an initial state, in which the moving end of the pushing member is proximate to the standing frame, and a pushing state, in which the moving end of the pushing member is distal from the standing frame; and a pair of guide frame units mounted to the machine frame, each of the guide frame units including a guide frame that is pivotably mounted to the machine frame, and at least one guide driving member that is mounted to the machine frame and the guide frame, the guide frame of each of the guide frame units having a pivot end that is pivotably mounted to the machine frame, and a guide rod that is opposite to the pivot end and that is located between the pushing units, the guide driving members of the guide frame units being operable to drive the guide frames of the guide frame units to convert between an open state, in which the guide rods of the guide frames are distal from each other, and a close state, in which the guide rods of the guide frames are proximate to each other.

2. The box folding machine as claimed in claim 1, further comprising a pair of guiding units that are mounted to the machine frame, the guiding units being elongated in the first direction, and respectively co-moving with the positioning units so that when the base frame unit is in the first position, the guiding units are proximate to each other in the second direction, and that when the base frame unit is in the second position, the guiding units are distal from each other in the second direction, each of the guiding units limiting orientation of the positioning seat of the respective one of the positioning units.

3. The box folding machine as claimed in claim 2, further comprising a pair of linear guide rail units each of which is disposed between a respective one of the guiding units and a respective one of the positioning seats, the linear guide rail units being spaced apart from each other in the second direction, each of the linear guide rail units including a guide rail that is elongated in the first direction, and a pair of slide blocks that are slidably coupled to the guide rail, each of the positioning seats being fixedly mounted to the slide blocks of the respective one of the linear guide rail units.

4. The box folding machine as claimed in claim 1, wherein the base frame unit includes two spaced-apart frame rods, a first seat body that is fixedly mounted to the frame rods, two second seat bodies that are located at two opposite sides of the first seat body, that are movably mounted to the frame rods, that are respectively adjacent to the end portions, and that are respectively and rotatably mounted to the positioning seats of the positioning units, a shaft that is connected to the first seat body and that is rotatably mounted to the machine frame, and a swing arm that is connected to the shaft, the base driving member being operable to drive the swing arm to rotate such that the base frame unit rotates relative to the machine frame.

5. The box folding machine as claimed in claim 1, wherein each of the base driving member, the pushing driving members of the pushing units, and the guide driving members of the guide frame units is configured to be a pressure cylinder.

* * * * *